April 12, 1966 R. D. LINVILLE 3,245,584
METHOD AND APPARATUS FOR MIXING AND BLENDING
Filed May 20, 1964 6 Sheets-Sheet 6

INVENTOR.
Richard D. Linville

BY Fiddler, Bradley, Patmande & Petherbridge
ATTORNEYS

United States Patent Office 3,245,584
Patented Apr. 12, 1966

3,245,584
METHOD AND APPARATUS FOR MIXING AND
BLENDING
Richard D. Linville, 1136 Grand Court, Davenport, Iowa
Filed May 20, 1964, Ser. No. 368,818
23 Claims. (Cl. 222—57)

The present invention generally relates to a method and apparatus for maintaining a plurality of mechanisms operating in accord with a predetermined proportion and more particularly it relates to a method and apparatus for continuously and accurately blending and mixing a plurality of ingredients in a predetermined proportion.

The present invention is particularly suited for use in mixing and blending batches of granular material such, for example, as dry fertilizers and, therefore, the invention is described in connection with such a batch mixing system. It will be understood, however, that certain features of the method and apparatus herein disclosed may be employed in other mixing and blending applications where the ingredients of the mix are in the liquid or fluid state and in other controlled feeding systems. Moreover, the basic method and apparatus herein disclosed has application in other systems wherein several mechanisms are to be operated in a controlled relation to one another.

In the prior art, batch blending and mixing has been accomplished in several different ways but in all cases there is much to be desired. Perhaps the most commonly used method for batch blending and mixing granular ingredients is to first weigh out separate quantities of the individual ingredients and thereafter dump such quantities in their entirety into a mixing machine. The disadvantages of this method are that it is relatively slow, the resulting batch is not sufficiently homogeneous, and where the weight of the batch varies from one batch to another the calculations which must be made by the operator are quite difficult and frequently lead to errors in the proportions of the individual ingredients in the batch. Another prior art method of batch mixing employs separate hoppers into which the individual ingredients are placed. Each of the hoppers has a controllable gate opening and the sizes of the gate openings are initially calculated and set in an effort to obtain a continuous, proportional flow of the ingredients from the individual hoppers into mixing devices and conveyors. Apparatus for carrying out this method has involved extremely complex control systems and the initial setup time for each of the hopper gates is excessive. Moreover, the environmental conditions such as the temperature and humidity in the hoppers affect the rate at which the separate ingredients will flow through given size gate openings. Accordingly, this type of system generally results in excessive variations in the proportions of the ingredients in the batch.

Therefore, a principal object of the present invention is to provide a new and improved method and apparatus for mixing and blending ingredients in a predetermined proportion.

Another object of the present invention is to provide new and improved apparatus for enabling the rapid and continuous blending and mixing of several ingredients in a predetermined proportion.

Still another object of the present invention is to provide a new and improved method and apparatus for mixing and blending dry granular ingredients in a predetermined proportion.

Yet another object of the present invention is to provide new and improved means for sensing the proportional relationship of several continuously varying quantities.

Another object of the present invention is to provide new and improved means for continuously sensing the relationship between several variable quantities and for maintaining said quantities in a predetermined relationship.

A further object of the present invention is to provide a new and improved method and apparatus for controlling the operation of several driven means in a predetermined proportion.

A still further object of the present invention is to provide a new and improved motor control circuit.

A yet further object of the present invention is to provide a new and improved amplifier circuit.

Further objects and advantages and a better understanding of the present invention may be had by reference to the following detailed description taken in connection with the accompanying drawings wherein.

Briefly, the above and further objects are broadly realized in accordance with the present invention by providing a system in which several varying quantities are continuously measured and the values of such quantities are controlled in order to maintain such quantities in a desired relationship with respect to one of the quantities which is essentially uncontrolled. For this purpose, an electric circuit comprising a plurality of novel potentiometers is employed to maintain the sensed quantities in a desired proportion which may, in itself, be variable.

General description

Before considering in detail the apparatus illustrated in the drawings, a general discussion of the underlying theory involved in the method of the present invention will facilitate an understanding of the electric control circuits considered in detail hereinafter.

Fertilizer bulk blending plants are at the present time located throughout the agricultural areas of the country, and the customers, farmers, drive trucks to the plant to pick up several tons of the fertilizer they desire. When a farmer arrives at the plant he requests a given amount of fertilizer having ingredients of his choice in the relative proportions of his choice. For example, the farmer may want to purchase ten tons of a mixture of two parts potassium, four parts nitrogen and eight parts phosphate. Expressed differently, the customer desires five-sevenths of one ton of ingredient A, ten-sevenths of one ton of ingredient B, and two and six-sevenths tons of ingredient C, and very importantly, he wants these three ingredients homogeneously mixed in that proportion throughout the entire batch which he receives.

In order to provide such a batch in accordance with a preferred embodiment of the present invention, two and six-seventh tons of ingredient C is placed in a first hopper which has directly associated therewith a weighing scale. In like manner one and three-sevenths tons of ingredient B is placed in a second hopper also having a separate weighing scale associated therewith, and five-sevenths of one ton of ingredient A is placed in a third hopper also having a separate weighing scale associated therewith. The three hoppers thus contain all of the constituents of the batch in the proper weights and proportions. The three ingredients must now be blended, homogeneously mixed and placed in the customer's truck as quickly as possible. It will be apparent that with the assumed mixture, the scale associated with the second hopper measures twice the weight indicated by the scale associated with the third hopper, and the scale associated with the first hopper measures four times the weight indicated by the third hopper.

A plurality of individual screw type feed conveyors are associated with each of the individual hoppers and independent control means are provided for each of these conveyors which are operated so as to feed the ingredients from their associated hoppers into a common screw type conveyor where the individual ingredients are mixed together before being supplied to an elevator and a final screw type conveyor which transports the mix, while further mixing it, to the customer's truck. The individual feed conveyors are closely controlled and each are respectively driven at a rate so that during the entire operation the three separate scales continue to indicate weights in the same relative proportions which are set up at the beginning of the operation. Therefore, should one of the ingredients flow less freely than another or should one ingredient be more densely packed than another or for any other reason should the rate at which the conveyors convey the ingredients vary, the ingredients are, nevertheless, delivered to the common mixing conveyor in precisely the proportion requested by the customer. By thus controlling the speeds of the individual hopper emptying conveyors, once the desired proportions of the ingredients have been set up the entire operation is thereafter both automatic and rapid and results in an extremely precise blend in which the ingredients are homogeneously mixed prior to delivery to the customer's truck.

Figure 1:
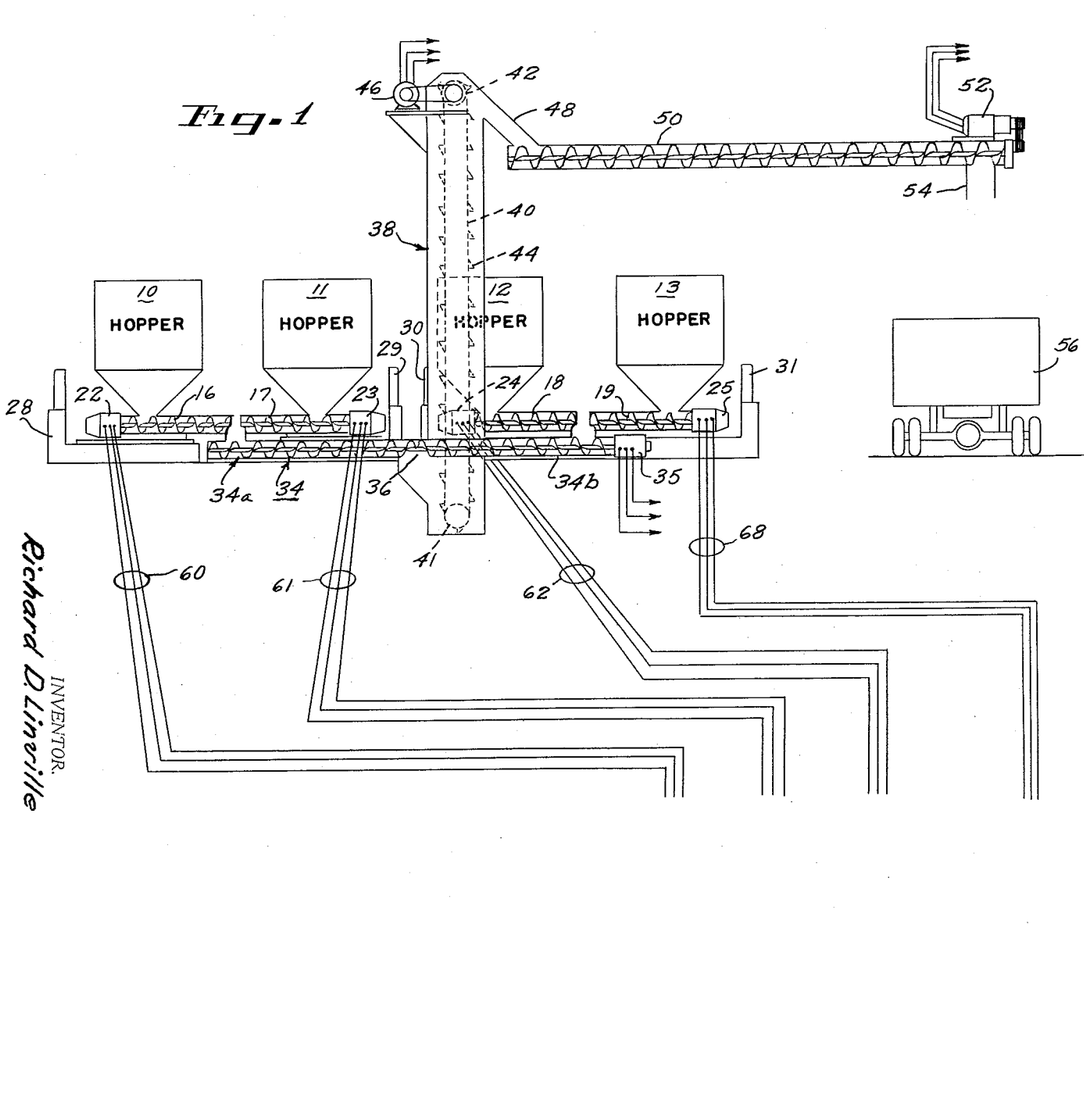
FIGS. 1–5 comprise a schematic diagram of a batch blending mixing system embodying the present invention.

Referring now to the drawings, there is schematically illsutrated in FIG. 1 a bulk mixer and blender comprising a plurality of vertical hoppers 10, 11, 12 and 13 each of which may be open at the top and has a conical bottom opening into one of a plurality of horizontal, hopper emptying feed screws 16, 17, 18 and 19. The feed screws 16–19 are respectively driven by means of a plurality of separately controlled D.C. electric drive motors 22, 23, 24 and 25, and the hoppers 10–13 and their associated feed screws 16–19 and feed drive motors 22–25 are respectively mounted on a plurality of weighing scales 28, 29, 30 and 31. The scales 28–31 may be of conventional construction for providing both a visual and an electrical indication of the weight of the ingredients contained in the associated hopper. The manner in which the electrical signals derived from the scales 28–31 are employed to control the speed of the motors 22–25 and thus the blending of the ingredients from the hoppers 10–13 is fully described hereinafter.

While the number of hoppers used in carrying out the present invention may vary from one application to another, it has been found that four hoppers are sufficient for most fertilizer bulk blending plants, and therefore, the present invention is described in connection with a system incorporating four such hoppers. It will be understood, however, that a greater or lesser number of hopper and associated conveyors may be used where expedient or desirable.

In a four hopper installation such as that shown in FIG. 1, the hoppers 10, 11, 12 and 13 are arranged in pairs; the hoppers 10 and 11 constituting one pair; and the hoppers 12 and 13 constituting the second pair. Consequently, the conveyors 16 and 17 are designed to rotate in opposite direction and thus feed the ingredients from their respective hoppers 10 and 11 to a common, central location where the ingredients fall together under the force of gravity into the left-hand end portion 34a of a mixing screw type conveyor 34. The conveyor 34 is driven at a continuous rate of speed by a suitable electric drive motor 35. The conveyors 18 and 19 are associated with the hoppers 12 and 13, respectively, and are driven in opposite directions thereby to feed the ingredients from the hoppers 12 and 13 to a central location where the ingredients fall together under the force of gravity into the right-hand end portion 34b of the screw type conveyor 34. It will be understood that the left-hand section 34a is pitched to feed the ingredients supplied thereto toward the right and the right-hand section 34b section 34a is pitched to feed that ingredients supplied thereto to the left. The two feed screw sections 34a and 34b meet at the location 36 where the separate mixes from the hoppers 10 and 11 and from the hoppers 12 and 13 are combined or blended and fall together under the force of gravity into the bottom portion of an elevator 38.

The elevator 38 is of conventional construction and comprises a continuous chain 40 mounted operatively between a pair of sprocket sets 41 and 42. A plurality of buckets 44 are spatially arranged on the chain 40, and sprocket 42 is suitably driven by an electric motor 46. As will be apparent to those skilled in the art, the mix which is fed from the conveyor portions 34a and 34b is lifted by the buckets 44 and thrown into an inclined chute 48 from which it feeds into the left-hand end of screw type conveyor 50 suitably driven by an electric motor 52. The conveyor 50 further mixes the various ingredients as the mix is transported to the right-hand end thereof from which it drops through a vertically disposed conduit 54 into a truck 56.

Power for each of the D.C. feed drive motors 22–25 is respectively supplied by means of four cables 60, 61, 62, and 63 each comprising three conductors connected to a plurality of motor control units 65, 66, 67, and 68. The motor control units are identical and, therefore only the latter unit 68 is described in detail. It is shown schematically in FIG. 3.

Figure 2:
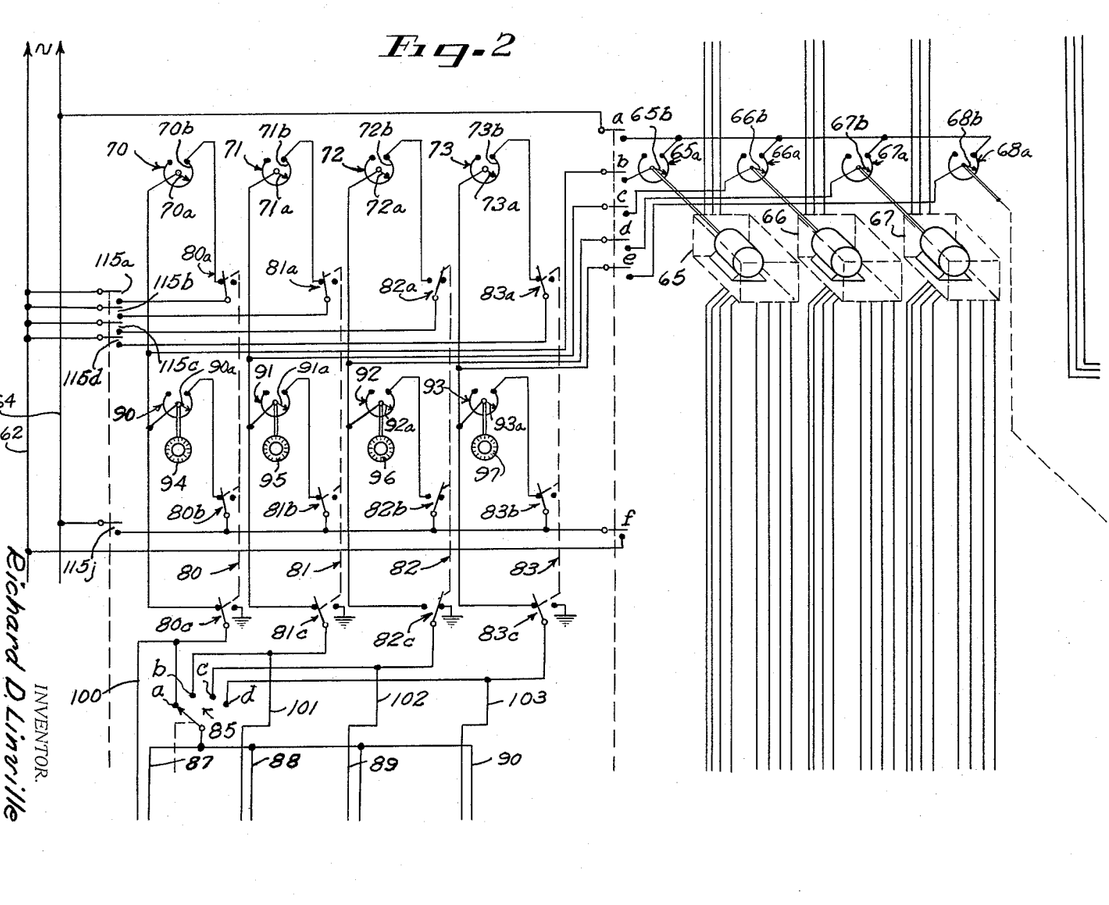

The weighing scales 28–31, which may be of the type manufactured and sold by Cardinal Scale Company and identified as Murphy-Cardinal Electronics, Inc., Batch Control, System MC 6335, each provides an electrical indication of the weight measured by it. To this end each of the scales 28–31 includes one of a plurality of rheostats 70, 71, 72, and 73 having a wiper element 70a, 71a, 72a, and 73a positionable along the associated resistance elements 70b, 71b, 72b, and 73b at a position corresponding to the weight measured by the associated scale. Preferably, the resistance elements 70b, 71b, 72b and 73b are such that the resistance between the wiper and the right-hand end thereof as seen in FIG. 2 varies linearly with the weight measured by the scale. The resistance values of the rheostats 70, 71, 72 and 73 thus indicate the weights of the ingredients in the hoppers 10–13. The scales are adjusted so that the rheostats have a resistance value of zero ohms when the hoppers are empty. For convenience in understanding the operation of the control circuits of the present invention it will be assumed that the resistance values of the rheostats 70–73 increase one ohm for each ten pounds of material in the associated hopper. This invention is described in connection with these parameters in order to simplify the required calculations, but it will be understood that any other weight to resistance ratio may be employed so long as all of the rheostats are the same.

The motor control units 65–68 each include a rheostat 65a, 66a, 67a and 68a having a wiper element 65b, 66b, 67b and 68b positionable on an associated resistance element in accordance with the speed control currents supplied from the units 65–68 to the D.C. drive motors 22–25. The resistance values of the rheostats 65a–68a are thus representative of the respective speeds of the drive motors 22–25.

In accordance with one feature of the invention, one hopper such as the first hopper 10 and its associated drive motor 22 are used as a reference or master, and the associated motor can be operated at any desired speed while the other motors 23–25 are operated at the proper relative speeds to blend into the batch the desired proportions of their associated ingredients. Accordingly, the hopper carrying the major ingredient of the blend should be used as the reference so that the associated motor will run at the greatest speed. However, the circuit permits the operator to select whichever hopper he wishes for the reference.

In order to permit manual setting of the desired proportions of the ingredients in the batch, a second set of rheostats 90, 91, 92 and 93 are provided. These rheostats respectively include hand-set wipers 90a, 91a, 92a and 93a, which are electrically connected to the respective wipers 70a, 70b, 70c, and 70d. The rheostats 90–93 are adapted to be hand set by means of a plurality of control knobs 94, 95, 96 and 97 connected to the wipers thereof and suitable graduated dials are associated with the knobs 94–97 to facilitate the accurate adjustment thereof.

During the initial filling or loading of the hoppers 10–13, the rheostats may be connected as potentiometers in Wheatstone bridge circuits which become balanced when the hoppers 10–13 are so filled that the rheostats 70–73 have resistance values respectively equal to the rheostats 90–93. When each such balanced condition exists, the associated one of the hoppers 10–13 contains the desired quantity of the respective ingredient for the final batch. When all of the hoppers are thus filled the loading operation is complete. The loading operation may be done automatically by control means well known in the art, or it may be done manually if expedient.

As is described in greater detail hereinafter, at the commencement of the blending operation the motors 22–25 are driven at a fixed speed to fill the associated conveyors 16–19 and then a motor speed set operation takes place wherein the feed drive motors 23–25 are very quickly adjusted to approximately the proper speeds relative to that of motor 22 for blending the desired mixture. In this phase of the cycle rheostat pairs 91 and 66a, 92 and 67a and 93 and 68a are connected in three separate bridge circuits with the rheostats 90 and 65a to develop three separate control voltage signals for supplying the motor control units 66–68. The units 66–68 thereby adjust the control currents to the motors 23–25 and thus the values of the rheostats 66a, 67a and 68a to maintain the ratios of the resistance values of each of the rheostats 66a, 67a, and 68a to the resistance values of the rheostats 91, 92 and 93 in the same proportions to the ratio of resistance value of the rheostat 65a to the resistance value of the rheostat 90 as originally set up. Since the resistance values of the rheostats 90–93 are proportional to the weights of the ingredients in the hoppers 10–13 which in turn control the output voltages from the motor control units 65–68, the feeding of the ingredients from the hoppers 10–13 is at approximately the required rates to maintain the originally set proportion.

The hand set rheostats 90–93 also perform a function in the system of the present invention during the automatic blending and mixing operation. Once the motors 22–25 are running at approximately the desired relative speeds, the scale-set rheostats 70–73 are switched into the heretofore described bridge circuits in place of the motor control rheostats 65a–68a to control the motor control units 65–68 to continuously adjust the speeds of the feed motors 23–25 to maintain the weights of the ingredients in the hoppers 10–13 and in the associated conveyors 16–19 in the initial proportions throughout the blending operation.

*Motor control units*

Figure 3:
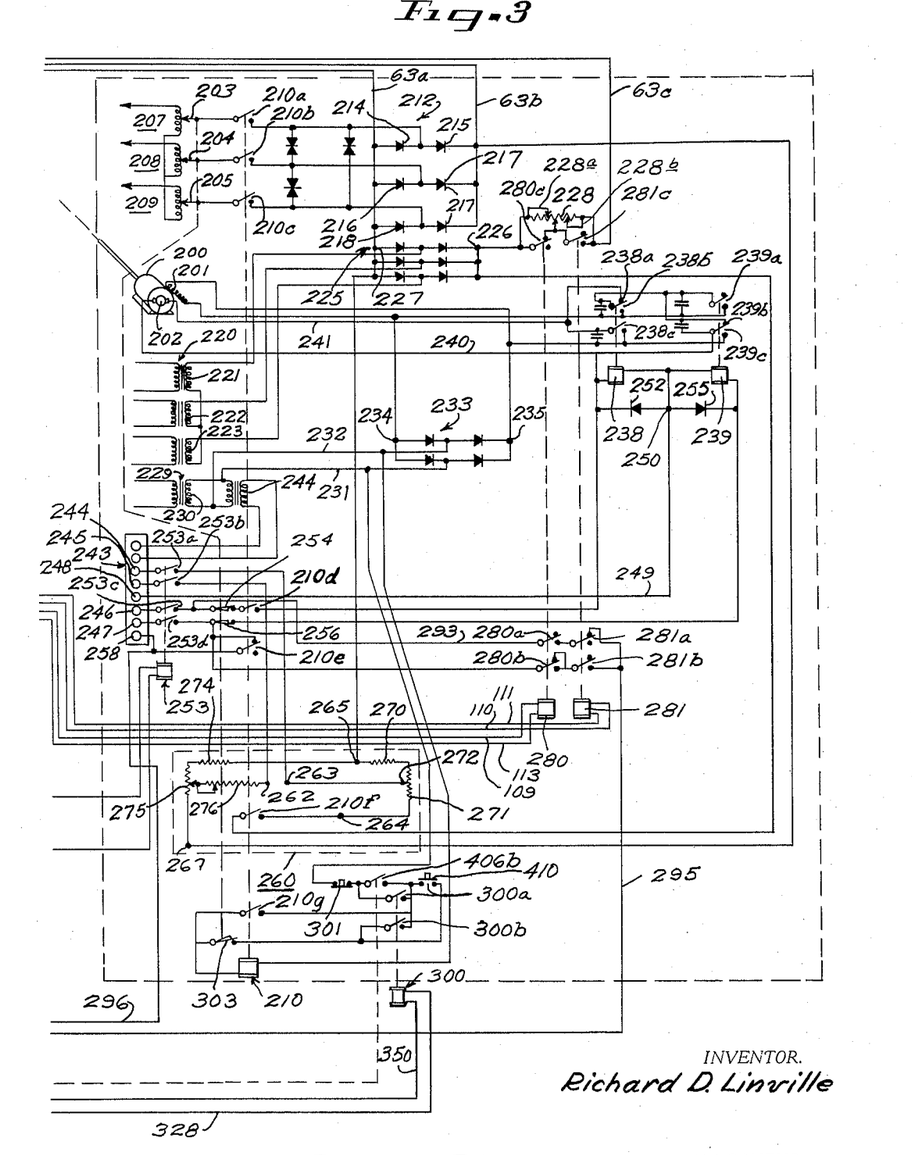
Figure 4:
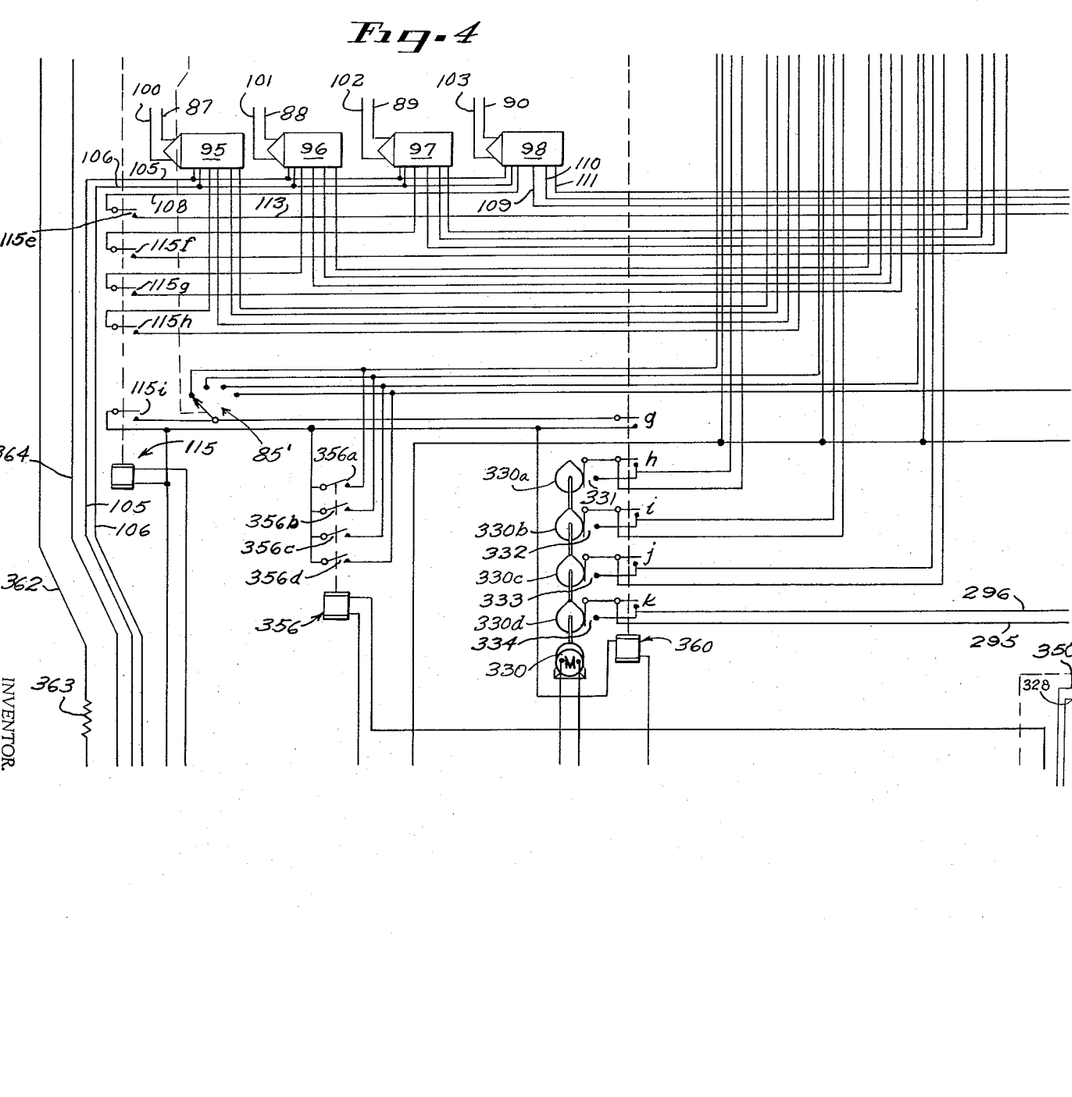

Each of the motor control circuits 65, 66, 67 and 68 are identical and therefore only the motor control circuit 68 which is shown in FIG. 3 is described in detail herein. They are quite similar to the Boston Ratiotrol unit manufactured by Pacific Industrial Controls Inc., Berkeley, California, and sold by Boston Gear Works, Quincy, Mass.

Referring to FIG. 3 it will be seen that the unit 68 comprises a D.C. motor control motor 200 having a field winding 201 and an armature 202, which drives a set of three brushes 203, 204 and 205 on a set of three auto transformers 207, 208 and 209 suitably energized from a source of three-phase electric power. The A.C. voltages thus selected from the windings of the transformers 207, 208 and 209 by the brushes 203, 204 and 205 is coupled through respective sets of normally open contacts 210a, 210b and 210c of a main control relay 210 to a three-phase full wave rectifier 212. The rectifier 212 comprises a plurality of diodes 214–219 and provides a D.C. voltage between the armature conductors 63a and 63b of the D.C. drive motor 25 (FIG. 1).

Considered in greater detail, the voltage from the winding 207 is supplied to the junction of the pair of serially connected diodes 214 and 215. The diode 214 is polarized to conduct conventional current from the conductor 63a to the winding 207 and the diode 215 is polarized to conduct conventional current from the winding 207 to the conductor 63b. In like manner, the diodes 216 and 217 are connected between the conductors 63a and 63b and the relay contacts 210b and the diodes 218 and 219 are connected between the conductors 63a and 63b and the relay contacts 210c. Accordingly, a rectified three-phase A.C. voltage is supplied across the conductors 63a and 63b and has a value determined by the setting of the brushes 203–205. The wiper 68b of the rheostat 68a (FIG. 2) is also connected to the armature of the motor 202 (FIG. 3) and thus has a position on the resistance element corresponding to the positions of the brushes 203–205.

In order to supply D.C. voltage to the field winding of the drive motor 25 via the conductors 63a and 63c, there is provided a suitably energized three-phase power transformer 220 having a plurality of secondary windings 221, 222, 223. A full wave three-phase rectifier 225 like the rectifier 212 is connected between the transformer windings 221, 222 and 223 to provide a fixed D.C. voltage between the terminals 226 and 227 which is connected across the conductors 63a and 63c through a field resistor 228. As more fully described hereinafter, the resistor 228 is partially switched in and out of the field circuit of the motor 25 to effect rapid acceleration or deceleration thereof.

In order to supply the field winding 201 of the motor control unit 200 with a fixed D.C. voltage, there is provided a transformer 229 having a secondary winding 230 which is connected via a pair of conductors 231 and 232 to a full wave rectifier 233 across the output terminals 234 and 235 of which the field winding 201 is connected. As will become more clear as the description proceeds the D.C. voltage from the rectifier 233 is controllably supplied to the armature 202 in either one polarity or the other under the control of a pair of relays 238 and 239. As shown, the rectifier terminal 234 is adapted to be connected through a set of normally open relay contacts 238b to a set of normally closed relay contacts 239b to a conductor 240 which connects to one side of the armature 202. The other side of the armature 202 is connected through a conductor 241 to a set of normally closed relay contacts 238a to the normally closed contacts 239b. The rectifier terminal 234 is also connected to a set of normally open contacts 239a on the relay 239 to the common contact terminal of the contacts 238a and 238b. The rectifier terminal 235 is connected to the conductor 241 and thus to the armature 202 through a set of normally open relay contacts 238c. The rectifier terminal 235 is also connected to a set of normally open relay contacts 239c to the conductor 240 and thus to the other side of the armature 202. With both of the relays 238 and 239 dropped out, no voltage is applied to the armature 202 of the motor control motor 200 and therefore the motor does not operate leaving the brushes 203, 204 and 205 in a fixed position. If, however, the relay 238 is energized and the relay 239 is not energized the voltage supplied to the armature 202 has a polarity to cause the brushes 203–205 to move in an upward direction. On the other hand, if the relay 239 is energized and the relay 238 is not energized, then the polarity of the voltage supplied to the armature 202 is such as to cause the motor 200 to operate in the reverse direction thereby to move the brushes 203, 204 and 205 downwardly.

The relays 238 and 239 are adapted to be energized from a rectifier unit 243 powered from a transformer 244 connected across the secondary winding 230 of the transformer 229. The rectifier 243 provides a pair of D.C. output voltages of positive polarity on each of a pair of terminals 246 and 247 relative to a common terminal 248 thereof. As shown, the common terminal 248 is directly connected by means of a conductor 249 to the coils of both relays 238 and 239. Also, the conductor 249 is connected to the center point 250 of a pair of diodes 252 and 255 which are connected in back to back relationship across the windings of the relays 238 and 239 respectively. The terminal 246 is connected through a set of normally open relay contacts 253c of a relay 253 through a set of limit switch contacts 254 and through a set of normally open relay contacts 210d to the other side of the coil of the relay 238. In like manner, the power terminal 247 is connected through a set of normally open contacts 253d through a set of limit switch contacts 256 to the other terminal of the coil of the relay 239. Accordingly, the relays 210 and 253 and the limit switches 254 and 256 control the operation of the relays 238 and 239. In addition to the above-described control circuit the relay 239 is further under the control of the relay 210 to return the motor control motor 200 to zero speed position when the relay 210 drops out. Accordingly, a set of normal closed contacts 210e are serially connected between the contacts 253d and a D.C. output terminal 258 on the power rectifier unit 243 so that when the relay 210 drops out the relay 239 is energized through the relay contacts 210e.

With the relay 253 picked up, terminals 244 and 245 of control power box 243 are connected to a manual speed voltage comparator circuit 260 through the normally open contacts 253a and 253b.

A fixed voltage from the rectifier 225 is supplied to terminals 264 and 265, and the variable voltage of the armature of drive motor 25 furnished by rectifier 212 is connected to input terminals 265 and 267. It may be seen that terminal 265 is directly connected to common rectifier terminal 227 and the conductor 63a connecting to the armature and field winding of drive motor 25, and the terminal 264 is connected through a set of normally open contacts 210f of the constant voltage terminal 226 of the rectifier 225. The terminal 267 is connected to the variable voltage terminal of rectifier 212 and conductor 63b connecting to the armature only of drive motor 25.

Potentiometer 271 is a voltage divider which is a manual speed control and delivers a selected voltage between 0 and full voltage of rectifier 225 to terminal 244 of control power box 243 through terminal 263 through normally open contact 253a. The voltage being supplied to the armature of drive motor 25 through rectifier 212 is delivered through terminal 267 to trimmer potentiometers 275 and 276 and thence to terminal 262 of voltage comparator circuit 260. From there, it is delivered through normally open relay contact 253b to terminal 245 of control power box 243.

If there is more than approximately one volt difference between the terminals 244 and 245, power will be delivered to relay 238 or 239 through terminal 248 and either 246 or 247 depending on the polarity of the voltage difference on terminals 244 and 245. Thus the proper relay 238 or 239 will act to drive speed control motor 200 in the proper direction until the voltage across terminals 244 and 245 balance within one volt. This control, then, if only for manual speed control and can only be operated when relay 253 is actuated.

The circuit of FIG. 3 is a standard 3 H.P. Boston Ratiotrol unit identified above to which has been added relay 253, relay 300, relay 406, relay 280, relay 281, field resistor 228 and position sensing rheostat 68a and associated circuitry. The control rectifier unit 243 is an encapsulated module having the input terminals 244 and 245 suitably connected to oppositely biased control rectifiers whose outputs are coupled to the terminals 246 and 247. When the D.C. input voltage applied to the terminals 244 and 245 is less in absolute value than one volt, the voltage on terminals 246 and 247 is zero. When, however, the one volt bias on either of the control rectifiers is exceeded, a voltage of six volts appear on the corresponding output terminal 246 or 247.

In order to enable control of the relays 238 and 239 by means of signals derived from an amplifier 98, there is provided a pair of relays 280 and 281. The relay 280 is referred to hereinafter as an UP relay since it is picked up in order to increase the speed of the motor 25, and the relay 281 is referred to hereinafter as a DOWN relay since it is picked up in order to decrease the speed of the motor 25. The coil of the DOWN relay 281 is connected by means of a pair of conductors 110 and 111 to a pair of output terminals of the amplifier 98. The amplifier terminals 98 have an A.C. output voltage thereon whenever the speed of the associated feed drive motor 25 should be reduced. The coil of the UP relay 280 is connected by means of a pair of conductors 109 and 113 and the set of normally open relay contacts 115e to the output terminals of the amplifier 98 on which an output voltage appears when the associated feed drive motor 25 should be operating at a faster speed. Hence, with the relay 115 picked up if the motor 25 is going at a slower speed than necessary, the UP relay 280 is energized. On the other hand, if the motor 25 is going at a greater speed than desired, the DOWN relay 281 is energized and the relay 280 is de-energized. If the motor 25 is operating at the proper speed, both of the relays 280 and 281 are dropped out.

As shown, the relay contacts 253c are connected by means of a conductor 293 to a set of normally open relay contacts 280a and thence through a set of normally closed relay contacts 281a to a conductor 295. A conductor 296 is connected to the D.C. power terminal 258 of the power unit 243 and a periodically closed switch 334 is connected between the conductors 295 and 296 to supply pulses of D.C. voltage for energizing the motor 200. Hence, with the UP relay 280 energized and the DOWN relay 281 de-energized, D.C. current is supplied from the terminal 258 to the coil of the relay 238 to energize it thereby to speed up the motor 202 and in turn increase the armature voltage to the drive motor 25 causing it also to increase its speed. If, on the other hand, the DOWN relay 281 is picked up and the UP relay 280 is dropped out, pulses of voltage are supplied through the normally open contacts 281b, through normally closed contacts 280b and through the limit switch 256 to the coil of the relay 239 causing it to be energized thereby to decrease the speed of the motor 200 and causing a corresponding decrease in the voltage supplied to the armature of the motor 25.

During normal operation of the system the relay 210 is maintained energized by means of its pair of holding contacts 210g which are serially connected with the coil across the transformer secondary winding 230 in series with a set of normally open contacts 300a of a relay 300 and a set of normally closed manually operable stop switch contacts 301. The relay 210 is picked up during normal operation of the system through a set of limit switch contacts 303 which are serially connected with the coil of the relay 210 across the power secondary winding 230 with a set of normally open contacts 300b, and 300a, and stop switch 301. It will be apparent that opening the switch 301 causes the relay 210 to drop out.

In order to decrease the recovery time of the motor 25, the UP relay 280 includes a set of normally closed contacts 280c connected across approximately half of the field resistor 228. The DOWN relay 281 includes a similar set of normally open contacts 281c which are connected across the remaining half of the field resistor 228. As previously indicated, the resistor 228 is a field resistor for the motor 25. When the relay 280 is picked up, the field resistance for the motor 25 is increased thereby to weaken its field and its ability to generate back E.M.F. Hence, a rapid increase in the armature current is permitted and a corresponding rapid increase in speed results. Therefore, when the UP relay 280 is energized not only is the armature current increased by virtue of the relay 238 picking up and causing an adjustment in the position of the brushes 203–205 but the field resistance for the motor 25 is also increased. On the other hand, when the DOWN relay 281 is energized in order to slow down the motor 25, not only is the armature current decreased by picking up the relay 239 but simultaneously the field resistance is increased thus quickly slowing down the motor causing it to reach the optimum speed condition more rapidly than would otherwise be the case.

*Automatic operation*

Consider now, a typical automatic operation of the system of the present invention as shown in FIGS. 1–7. For this purpose let it be assumed that we are to blend and mix a fourteen thousand pound batch consisting of eight thousand pounds of an ingredient A, four thousand pounds of an ingredient B and two thousand pounds of an ingredient C. Since only three ingredients are being mixed, only three of the hoppers 10–13 need be used. Using hopper 10 as the reference or master hopper, eight thousand pounds of ingredient A is placed therein, four thousand pounds of ingredient B is placed in hopper 11 and two thousand pounds of ingredient C is placed in hopper 13. The hopper 12 remains empty. If expedient, ingredient C may have been placed in hopper 3 and in that case hopper 4 would have remained empty during this particular blending and mixing operation. As noted hereinabove, the loading operation wherein measured quantities of the separate ingredients are placed in the respective hoppers may be carried out automatically or manually as conditions permit. Where, however, the loading operation is automatic, by suitable relay connections the scale set rheostats 70–73 and the hand-set rheostats 90–93 may be used in the automatic loading control system which controls the supply of the ingredients to the hoppers.

It will be understood that whether or not the hand-set rheostats 90–93 are employed in the automatic loading operation they should nevertheless be set by the operator to the resistance values corresponding to the weights of the ingredients in the batch. Accordingly, the operator will adjust the control knob 94 such that the rheostat 90 has a resistance value of 800 ohms. He will set the control knob 95 such that the rheostat 91 has a resistance value of 400 ohms, and he will set the control knob 97 such that the rheostat 93 has a resistance value of 200 ohms. When the hoppers 10, 11 and 13 are properly loaded, the scale set rheostat 70 will have a resistance value of 800 ohms, the scale set rheostat 71 will have a resistance value of 400 ohms and the scale set rheostat 73 will have a resistance value of 200 ohms. The scale set rheostat 72 and the hand-set rheostat 92 will each have a resistance value of zero inasmuch as the hopper 12 and the conveyor 18 are empty under the assumed conditions. Moreover, inasmuch as the D.C. feed motors 22, 23 and 25 are stopped when the blending operation is initiated, the rheostats 65a–68a associated with the motor control units 65–68 will each have a resistance value of zero ohms, the wipers 65b–68b being in contact with the right hand end of the associated resistance elements as shown in FIG. 2.

In order to set up the control circuits of FIGS. 1–7 in order to blend the desired proportion of the ingredients A, B, and C in the batch, four sets of three double pole single throw switches 80, 81, 82 and 83 are respectively connected with the rheostats 70–73 and 90–93. Inasmuch as the hoppers 10, 11, and 13 are to be used in the assumed situation, the blades of the switches 80, 81 and 83 are placed in the ON position and the blades of the switch 82 is placed in the OFF position, all as shown in FIG. 2. In these positions, the third switching level 80c of the switch 80 connects the wipers 70a and 90a to the a contact of a master hopper, rotary selector switch 85. Switch level 81c in like manner connects the wipers 71a and 91a to a contact b of the switch 85 and switch level 83c connects the wipers 73a and 93a to a contact d of the switch 85. Switch level 82c connects the contact c of switch 85 to ground. The master hopper selector switch 85 is used by the operator to select the one of the hoppers 10–13 which will be used as the master or reference hopper. The wiper of the switch 85 is connected by means of the conductors 87, 88, 89 and 90 to common input terminals of a plurality of amplifiers 95, 96, 97 and 98. In the drawings, the selector switch 85 is positioned with the wiper thereof in contact with the contact element a whereby the hopper 10 is selected as the master or reference hopper and the wipers 70a and 90a are connected to the common input terminal of each of the amplifiers 95–98. The other input terminal of each of the amplifiers 95, 96, 97 and 98 is respectively connected by means of conductors 100, 101, 102 and 103 to the contact elements a, b, c and d of the selector switch 85.

Figure 7:
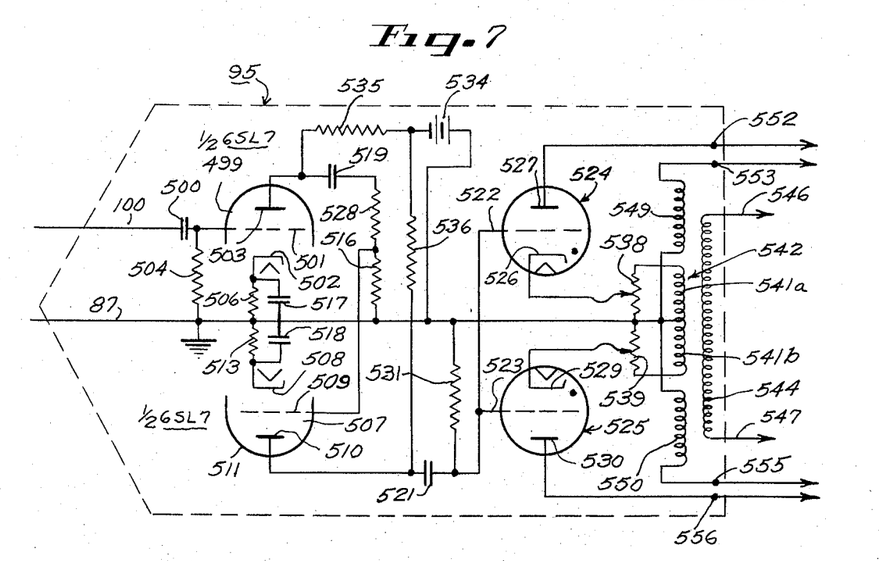
FIG. 7 is a schematic electric circuit diagram of an amplifier adapted for use in the circuit shown in FIGS. 1–5.

The amplifiers 95–98 are identical and described in detail hereinafter in connection with FIG. 7 wherein one such amplifier is illustrated in schematic form. Although the amplifier circuit of FIG. 7 is well adapted for use in the amplifiers 95, 96, 97 and 98, it will be understood that other amplifier circuits may be employed which produce the required output signals in response to a voltage signal supplied between a pair of input terminals. In addition to a pair of A.C. energizing terminals connected across a pair of A.C. power conductors 105 and 106, each of the amplifiers 95–98 includes two pairs of output terminals. One pair provides a "speed up" output signal and the other provides a "slow down" output signal. Accordingly, the amplifier 98 has the pair of "speed up" output terminals respectively connected to the pair of conductors 108 and 109 and the pair of "slow down" output terminals connected to the pair of conductors 110 and 111. Since the amplifier 98 is associated with the motor control unit 68 which is shown in detail in FIG. 3, the manner in which the amplifiers 95–98 provide output signals to which their associated motor control units 65–68 respond has been described hereinbefore in connection with the manner in which the output signals from the amplifier 98 control the motor control unit 68.

When the voltage signal appearing between the conductors 90 and 103 which are connected to the input terminals of the amplifier 98 indicates that the drive motor 25 should be slowed down in order to maintain the proper proportion of ingredient C to ingredient A in the mix, a signal appears between the "slow down" output terminals connected to the conductors 108 and 109. On the other hand, when the voltage signal between the conductors 90 and 103 indicates that the drive feed motor 25 should be speeded up a signal appears on the "speed up" output terminals of the amplifier 98 which are connected to the coductors 110 and 111. As shown, the conductors 110 and 111 are connected directly across the coil of the DOWN relay 281 shown in FIG. 3. The conductor 109 is connected directly to one terminal of the coil of the UP relay 280 and the conductor 108 is connected through a first set of relay contacts 115e and a conductor 113 to the other end of the coil of the UP relay 280. Similar sets of normally open contacts 115f, 115g and 115h of the relay 115 are connected between the amplifiers 95, 96 and 97 and the UP relay coils in the corresponding motor control units 65–67. Accordingly, when the relay 115 is de-energized and thus dropped out, the "speed up" terminals of the respective amplifiers are not connected to the UP relay 280 of the motor control units but when the relay 115 is energized and thus picked up both the "speed up" and "slow down" output terminals of the amplifiers 95–98 are connected to the coils of the UP and DOWN relays 280 and 281. The relay 115 has additional sets of normally open contacts which are described hereinafter in connection with the operation of the portions of the circuit which they control.

The manual speed selector control potentiometer 271 in each of the motor control units 65–68 should be set to the maximum speed at which it is desired to run any of the feed drive motors 22–25. Ordinarily, this will be about three-quarters of full speed, and, therefore, each of the potentiometers 271 should be set to about the three-quarters speed position. As a result, the feed drive motor 22 will run at three-quarter speed throughout the blending operation and the other feed drive motors 23 and 25 will be operated at proportionately lower speeds. As more fully described hereinafter, during the initial phase of the blending cycle when the conveyors 16–19 are not full, all of the feed drive motors 22–25 will run at about three-quarter speed.

The speed control potentiometer 271 need not be adjusted for each different set-up of the system.

Figure 5:
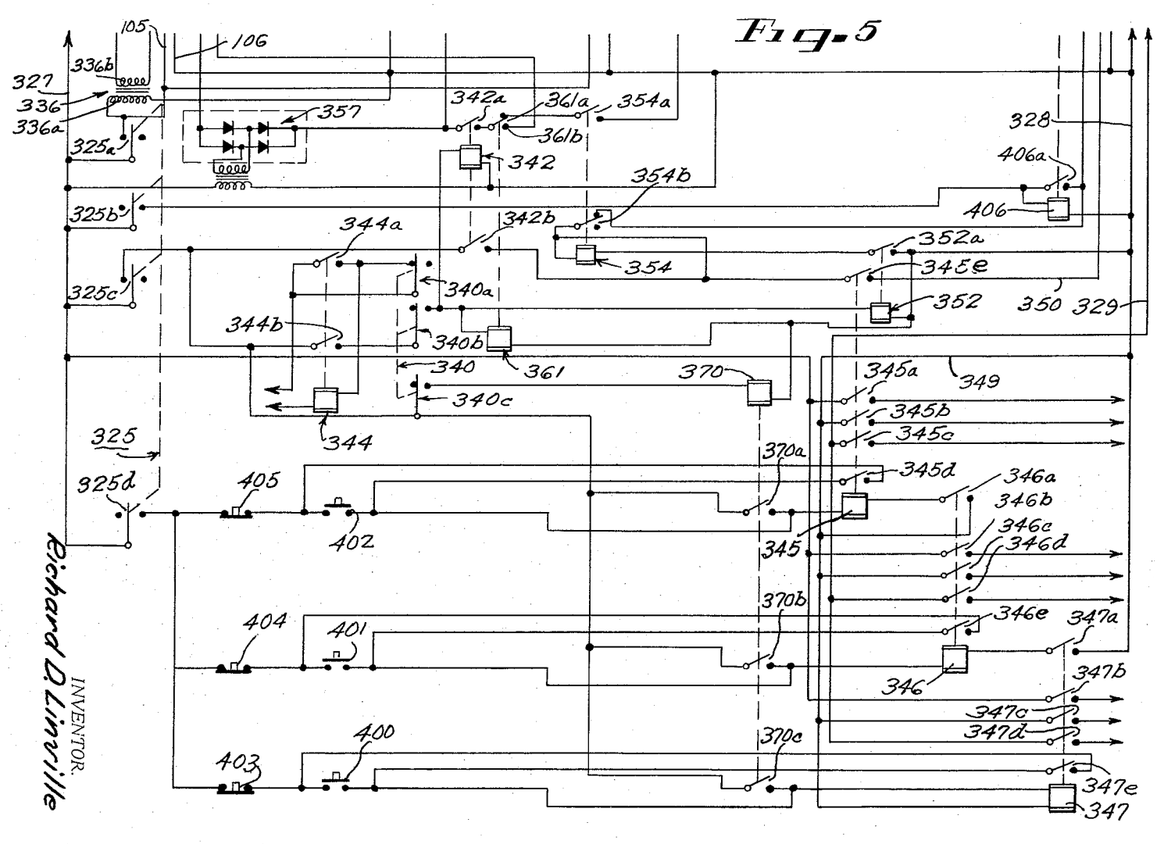
Figure 6:
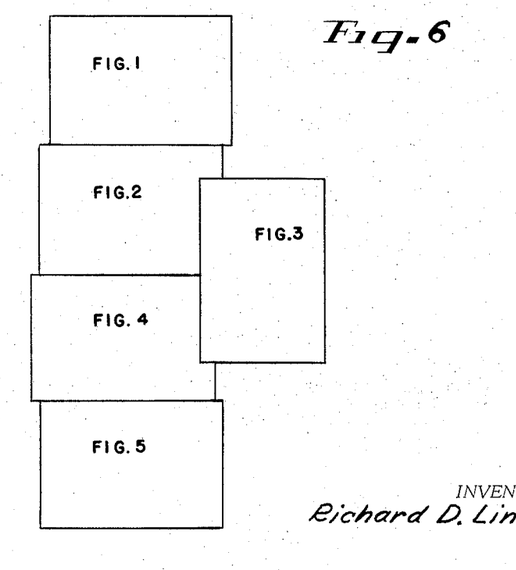
FIG. 6 is a map showing the manner in which FIGS. 1–5 may be assembled to illustrate the entire circuit on a single plane surface.

In order to initiate an automatic blending and mixing cycle of operation, a selector switch 325 is moved from the central OFF position shown in FIG. 5 to the left-hand automatic operation position wherein the switch blades in respective switch sections 325a, 325b, 325c and 325d engage the left hand contact elements. Switch section 325a thus connects an A.C. power line 327 to the conductor 105 which is connected to each of the amplifiers 95–98. The other A.C. power conductor 106 is directly connected as shown in FIG. 5 to another A.C. power line 328. The power lines 327 and 328 are connected to a three-phase power system as is another power line 329. The amplifiers 95–98 are thus energized for operation when the switch 325 is placed in the automatic position.

Switch section 325a, when in the automatic position, also connects a self starting constant speed A.C. motor 330 between the power lines 327 and 328. A plurality of cams 330a, 330b, 330c and 330d are mounted on the armature shaft of the motor 330 and repeatedly close a plurality of normally open switch contacts 331, 332, 333 and 334. The cams 330a–330d are configured to close the switches 331–334 for short durations. Also, the primary winding 336a of a step down signal supply transformer 336 is connected by the switch connection 325a across the power lines 327 and 328 whereby the secondary winding 336b is adapted to supply 15 volt A.C. power to the various elements connected thereacross.

A main operation control switch 340, having a plurality of switching levels 340a, 340b, and 340c, may now be switched from the OFF position shown in the drawings to the OPERATE position wherein the respective switch blades of the section 340a–340c are in the right-hand contact positions. With the switch 340 in the OPERATE position, the feed drive motors 22–25 are initially driven at the speeds set by the manual speed controls 271 for a time sufficient to fill the associated conveyor screws. Thereafter, the motors 22–25 are driven at the approximate speeds required in order to blend the ingredients from the hoppers in the proper relation. Switch section 340b thus connects the coil of a relay 342 between the power lines 327 and 328 through a set of normally open contacts 344b of a relay 344 and section 325c of the selector switch 325. The coil of the relay 344 is connected to the circuits which control the hopper loading operation so that the relay is picked up when the hopper loading operation is completed. The relay 344 is thus closed at the time the hoppers are filled and the automatic cycle is to begin. Should the hoppers not be filled at the time the operator sets the control switch 340 to OPERATE position, nothing can take place until the loading operation has been completed and the operator resets switch 340 to "OFF" position to complete the circuit around a set of normally open holding contacts 344a so that relay 344 can pick up from the signal from the hopper loading operation. Once relay 344 has picked up, holding contact 344a keeps it picked up and switch 340 can be thrown to OPERATE position.

With the switch 340 in the automatic position, the coil of a relay 370 is connected between the power lines 327 and 328 to close the normally open relay contacts 370a, 370b and 370c thereby connecting the power line 327 to the coils of a plurality of conveyor motor control relays 345, 346 and 347. The other terminals of the coils of the relays 345–347 are connected by means of the conductor 349 to the power line 328 when all of the solenoids 345, 346 and 347 are energized. Considered in greater detail, when the relay 370 picks up, the coil of the relay 347 is connected by the heretofore described circuit between the power lines 327 and 328. Energization of the relay 347 starts the truck loading conveyor motor 52 through contacts 347b–347d and closes normally open contact 347a which connects the coil of the relay 346 to the power line 328. The relay 346 thus picks up and starts the elevator drive motor 46 through contacts 346b–346d and closes normally open contacts 346a to complete a circuit between the coil of the relay 345 and the power line 328. The relay 345 thus picks up and energizes the power supply circuits for the motors 22–25. Accordingly, the relays 347, 346, and 345 operate in a controlled sequence when the relay 370 picks up to prevent any conveyor from feeding into an inoperative conveyor.

The normally open contacts 345a, 345b, and 345c of the relay 345 are connected between the three-phase A.C. power lines 327, 328 and 329 respectively and supply three-phase electric power to the conveyor motor 35 (FIG. 1). The normally open contacts 346b, 346c and 346d are respectively connected between the three-phase power lines 327, 328 and 329 and supply three-phase electric power to the elevator motor 46 (FIG. 1). The normally open contacts 347b, 347c and 347d of the relay 347 are respectively connected between the three-phase power lines 327, 328 and 329 and provide three-phase electric power for the truck loading conveyor type motor 52 (FIG. 1). The normally open contacts 345d, 346e and 347e of the relays 345–347 are used during a manual control operation which is described hereinafter.

Closure of the contacts 342b of the relay 342 completes a circuit from the power line 327, through selector switch section 325c to relay contacts 345e, which are now closed, to a conductor 350 connected to one side of the coil of the motor control relay 300 (FIG. 3). The other side of the coil of the relay 300 is connected directly to the power line 328. Accordingly, the relay 300 is energized thereby to close normally open contacts thereof to energize all of the motor control circuits 65–68 in the manner described in connection with the motor control unit 68 of FIG. 3.

With the switch 340 in the OPERATE position, the switch level 340b completes a circuit from the power line 327, through the selector switch stage 325c and the contacts 344b to one side of the coil of a time delay relay 352. The other side of the coil of the relay 352 is connected to the power line 328. The time delay relay 352 picks up about six seconds after it is energized and its function is to operate all of the feed drive motors at the same speed during the six second time delay period to fill each of the conveyor screws 16–19. When the relay 352 picks up a set of normally open contacts 352a close to energize a relay 354 whose coil is connected in series with contacts 352a and contacts 342b between the power line 327 and the power line 328. During the six second time delay between the energization of the time delay relay 352 and the closing of its normally open contacts 352a, a relay 356 (FIG. 4) is energized through a set of normally closed contacts 354b on the relay 354. The coil of the relay 356 is energized through the third level 325c of the selective switch 325 through the normally open contacts 342b of the relay 342 through the normally closed contact 354b of the relay 354. The relay 356 thus picks up at the beginning of the blending operation and its normally open contacts 356a, 356b, 356c, and 356d all close thereby to energize each of the relays 253 in the motor control units 65–68. The relay 253 in the motor control unit 68 is shown in FIG. 3 and as described in connection therewith energizes the motor control motor 200 which thus operates to set a speed determined by the setting of the speed control potentiometer 271.

Inasmuch as the conveyor screws 16, 17, 18 and 19 must be filled before they can deliver any of their associated ingredients to the mixing screw 34, it is necessary to fill each of conveyor screws 16, 17, 18 and 19 before proportional control of the respective motors 22–25 begins. Therefore, according to a feature of the present invention briefly described above, each of the motors 22, 23, and 25 are driven at the same speed for a time sufficient to fill the conveyor screws 16, 17 and 19 respectively. It has been found that in a particular fertilizer blending plant the time required to fill these conveyors is six seconds. For other applications, however, the time delay measured by the relay 352 should be adjusted so that the conveyors 16–19 are approximately full when the relay 352 picks up and closes the contact 352a.

When the time delay relay 352 thus picks up and the relay 354 is thereby energized through the contacts 352a to open the contacts 354b and drop out the relay 356, control of the separate motor control units 65–68 is returned to the amplifiers 95–98. Considered in greater detail, the relays 253 in all of the motor control units 65–68 with the exception of the master unit drop out. In the assumed blending set up, the motor control unit 65 is the master unit and its relay 253 remains energized through switching level 85' of the master hopper selector switch 85 which is connected through the normally open relay contacts 115i to one output terminal of a conventional full wave rectifier 357. Accordingly, when the relay 352 times out the six second interval and the contacts 352a close, only the master feed drive motor 22 continues to run at the pre-selected speed.

Also, when the contacts 354a close, the coil of the relay 360 is energized through the circuit beginning at rectifier 360 and extending through the normally open contact 342a through normally closed contact 361a, through contact 354a, through the coil of relay 360 and back to the other side of rectifier 357.

When the relay 360 thus picks up, the normally open contacts 360a–360k close. The relay contacts 360h, 360i, 360j, and 360k connect voltage from the switches 331–334 to the contacts of the UP and DOWN relays 280 and 281 in the respective motor control circuits 65–68 so that the respective motor control motors 200 (FIG. 3) are energized by continuous current rather than pulses of current so as to permit rapid adjustment of armature voltage to proportional levels signaled by the amplifiers. Considered in greater detail, the contacts 360k are connected by means of conductors 295 and 296 to the motor control units 68 of FIG. 3 as heretofore described and the contacts 360h, 360i and 360j are connected to the units 65, 66, and 67. When the relay 360 picks up, the normally open contacts 360f close thereby to connect the right-hand end of the resistance elements of the rheostats 90, 91 and 93 to a conductor 362 connected in series with a resistor 363 to secondary winding 336b of signal supply step down transformer 336. The other end of the secondary winding 336b is connected via a conductor 364 to a set of normally open contact 115j on relay 115. During the initial twelve second time delay the relay 115 does not pick up whereby the hand-set rheostats 90, 91 and 93 are connected to the resistor 363. Resistor 363 is a voltage dropping resistor which lowers or raises the voltage across the bridge circuit as the total resistance of the bridge circuit varies. This permits rheostats to be set at very low positions for proportional sensing without causing a heavy current to flow through the low resistance elements. Relay contacts 360a connect the resistance elements of the motor control set rheostats 65a, 66a, 67a and 68a to the signal supply conductor 364. The wipers 65b–68b of the motor control set rheostats are respectively connected through relay contacts 360b–360e to the wipers 90a, 91a, 92a, and 93a and to the wipers 70a, 71a, 72a, and 73a. Inasmuch as the relay 115 has not been picked up, the resistance elements of the potentiometers 70–73 remain de-energized and do not form an operative part of the circuit. Also, inasmuch as the switch section 82c connects the input conductor 102 of the amplifier 97 to ground, the amplifier 97 is rendered inoperative to supply an output signal on either of its sets of output terminals. The input terminals of the amplifier 95 are connected together by the switch 85 and therefore, it provides no output signal on either of its sets of output terminals. Inasmuch as the relay 253 in the motor control unit 65 is picked up, however, the motor control motor 200 in the unit 65 will be stopped at the required position to run the associated feed drive motor at the speed set on the associated speed set potentiometer 271. An additional time of approximately six seconds is required for the feed motors 23 and 25 to be brought down to the proper proportional speed and therefore a time delay relay 361 is adjusted to provide a time delay of twelve seconds. The first six seconds of which time delay is used to drive all of the feed motors at the same speed in order to fill the associated conveyors 16–19 and the second six seconds of time delay is used in order to bring the feed drive motors 23 and 25 into the proper proportionate speeds with respect to the master motor 22. At the end of the overall twelve second time delay period, the relay 361 picks up thereby to close the normally open contacts 361b which are serially connected with the coil of the relay 115 and the normally open relay contacts 342a. Since the relay 342 is picked up at the beginning of the blending operation, the closing of the contacts 361b picks up the relay 115. When the relay contacts 361a open, the relay 360 drops out thereby to disconnect the motor control set rheostats 65a–68a from the circuit. The scale set rheostats 70, 71 and 73 are now energized through the normally open relay contacts 115a, 115b, 115c and 115d. Also, closing of the relay contacts 115j connects the right-hand end of the resistance elements of the hand-set rheostats 90, 91 and 93 to the signal supply conductor 364, and opening of the relay contacts 360f disconnects the right-hand end of the hand-set potentiometer 90, 91 and 93 from the other signal supply conductor 362. The net result of the picking up of the relay 115 and the dropping out of the relay 360 is that the scale set potentiometer 70–73 are connected in series with the hand-set potentiometer 90–93 across the signal supply conductors 362 and 364 in place of the motor control set rheostats 65a–68a. Moreover, the phase of the A.C. signal supplied to each of these newly formed potentiometers is reversed from that which existed during the speed set operation. The reason for this is that during the speed set operation if the motor control set rheostats 65a–68a have too great a value of resistance, it is necessary to slow down the operation of the associated motors; but during the proportional feeding operation when the weight remaining in the hoppers is being measured, if the resistance value of the scale set rheostats 70–73 is too great it is necessary to increase the speed of the associated drive motors. Inasmuch as the same amplifiers 95–98 are used during both phases of operation, the phase of the A.C. signal which energizes the control circuits must be reversed.

The system is now in the scale controlled automatic phase of operation and continues to control the energization of the UP and DOWN relays 280 and 281 in the motor control units 66 and 68 in response to the signals from the amplifiers 96 and 98. It will be noted that when the relay 115 is picked up, the normally open contacts 115e–115h thereof close thereby to connect the "speed up" output terminals of the amplifiers 95–98 to their associated UP relays 280. The reason contacts 115e–115h are opened during the speed set time delay is to prevent "hunting" of the motor control motor 200 for the exact proportional speed position. Motor control motor 200 runs very fast when impulsing switch 330 is by-passed by relay 360 but motor control motor 200 stops quickly enough to be in close approximation of proportional speed position. Motor control motor 200 armature is shorted when relays 238 and 239 are both de-energized bringing about regenerative braking of the motor.

As the ingredients from the hopper 10 leave the conveyor 16, the wiper 70a of the scale set rheostat 70 moves to decrease the effective resistance of the rheostat 70 whereby the voltage supplied via the conductors 88 and 90 to the common terminals of the amplifiers 96 and 98 becomes biased toward the polarity of conductor 362. Unless the wiper 71a is being moved under the control of the respective scale to a proportionately lower resistance selecting position, a voltage difference of significant polarity will exist between the input conductors 88 and 101 to the amplifier 96 and a speed up output signal will be supplied to the associated UP relay 280. On the other hand, if the motor 23 is operating at a speed such that the ingredient B is being fed too rapidly from the conveyor 17 and as a consequence the wiper 71a is positioned to indicate too low a resistance value in the rheostat 71, a voltage of opposite polarity will appear between the conductors 88 and 101 and will be such as to produce a signal on the "slow down" output terminals of the amplifier 96. This "slow down" voltage will be coupled through the relay contacts 115g to the coil of the associated DOWN relay 281. Accordingly, the DOWN relay will pick up and the speed of the motor 23 will be decreased to more slowly feed the ingredient B from the hopper 11. The system thus continues operating until each of the hoppers 10, 11 and 13 indicate an ingredient weight of zero causing the relay 344 to drop out. Opening of the relay contacts 344a and 344b de-energizes the control circuits and stops the drive feed motors 22–25. The other conveyor motor control relays 345, 346 and 347 remain picked up at this time, however, in order to permit the contents of the associated conveyors to be emptied. Therefore, once the conveyors have fed out to the truck all of the material contained therein, the operation switch 340 should be returned to the OFF position thereby to deenergize the relay 370 opening the contacts 370a–370c thereof to drop out the relays 345, 346 and 347 thus deenergizing the associated conveyor motors 35, 46 and 52.

Once the hoppers have been emptied and their associated conveyors 16, 17, 18 and 19 have been emptied whereby the rheostat 70–73 indicate zero resistance and the relay 344 drops out, the loading of the hoppers for the next operation can begin. This is possible because the energization circuit for the relay 344 is not again completed until the operation switch section 340a is returned to the OFF position. Therefore, when the relay 344 drops out at the end of a mixing operation and the operate switch 340 is still in the automatic position, the relay 344 cannot again pick up to initiate a succeeding blending operation.

*Manual operation*

In order to operate this system manually, the switch 325 should be moved to the right hand or manual position. The position of the automatic operation switch 340 is of no consequence in this operation inasmuch as the switch is not energized when the switch 325 is in the manual position. The conveyor motors 35, 46 and 52 should be energized and this is accomplished by first closing a starting switch 400 which energizes the coil of the relay 347 starting the motor 52. Thereafter, a start switch 401 is closed to energize the coil of the relay 346 through the contact 347a which has been closed where the relay 347 picked up. This starts the motor 46. The start switch 402 for the motor 35 is then closed to energize the coil of the relay 345 through the contact 346a of the relay 346 which has now been picked up. Any of these conveyor motors may be stopped by opening the respective stop switches 403, 404 and 405 which are serially connected in the energization circuits of its associated relay.

With the switch 325 in the manual position, switch section 325b serially connects the coil of a relay 406 between the power lines 327 and 328 whereby the relay 406 picks up and closes its contacts 406a which are serially connected with the coil of the relay 356 to the power line 328. The open contacts 356a–356d thereby close to pick up the relays 253 in each of the motor control units 65–68. Moreover, the normally open contacts 406b in the motor control unit 68 and similar contacts in the other motor control units 65, 66 and 67 close. Accordingly, the motor control units 65–68 may now be started by closing respective manual START switches 410 to pick up the relays 210. The motor control motors 200 will then speed up to the speed set by the respective speed control potentiometers 271 and the speed of each of the associated feed motors may thus be adjusted by means of the potentiometers 271 in the associated motor control units 65–68.

In order to stop the feed drive motors 22–25 the stop switches 301 in each of the motor control units 65–68 are opened thereby to drop out the relay 210. The conveyor motors may be stopped by first opening the stop switch 405, then opening the stop switch 404 and finally opening the stop switch 403. If desired, all of the fixed speed conveyor motors 35, 46 and 52 may be stopped by pressing the stop button 403, thus dropping out the relay 347 which in turn drops out the relay 346 which in turn drops out the relay 345. The operation is finished and the selector switch 325 should be returned to the intermediate OFF position shown in FIG. 5.

*Amplifier circuit*

Referring now to FIG. 7, there is shown a schematic circuit diagram for use in the amplifier 95 and showing the input conductors 87 and 100 connected thereto. As illustrated, the voltage signal on the conductor 100 is connected through a series capacitor 500 to the control electrode 501 of a triode 499 comprising a cathode 502 and an anode 503. A grid leak resistor 504 is connected between the control electrode 501 and the input conductor 87 and through a cathode resistor 506 to the cathode 501. The amplifier 95 includes another triode 507 comprising a cathode 508, a control electrode 509 and an anode 510. Both of the triodes 499 and 507 may be enclosed in a common envelope 511. The cathode 508 is connected through a cathode resistor 513 to the input conductor 87 and a grid leak resistor 516 is connected between the control electrode 509 and the cathode resistor 513. A pair of capacitors 517 and 518 are respectively connected across the cathode resistors 506 and 513.

As explained heretofore in connection with the overall operation of the system, when the motors respectively associated with the amplifiers 95–98 are operating at the proper speed for proportional feeding of the respective ingredients, the voltage on the conductor 100 equals the voltage on the conductor 87. During the intial speed set operation, for example, an A.C. voltage appears across the resistor 504 and is amplified and connected by a capacitor 519 and a resistor 520 to the control electrode 509 of the second triode section 507. The signal is further amplified in the second triode 507 and coupled by a capacitor 521 directly to the control electrodes 522 and 523 of a pair of Thyratrons 524 and 525 respectively. The Thyratron 524 comprises a cathode 526 and an anode 527. The Thyratron 525 comprises a cathode 529 and an anode 530. An output resistor 531 is connected between the input or reference level conductor 87 and the capacitor 519 so that the amplified A.C. voltage is developed across the resistor 531. D.C. anode voltages for the triode sections are supplied from a suitable source of D.C. voltage 534 through a pair of plate resistors 535 and 536 respectively.

An A.C. biasing voltage for the cathodes 526 and 529 is provided by means of a pair of potentiometers 538 and 539 which are respectively connected across serially connected sections 541a and 541b of the secondary winding 541 of a power transformer 542 having a primary winding 544 suitably connected to a source of A.C. power by means of a pair of conductors 546 and 547. The transformer 542 includes an additional secondary winding 549 which is serially connected between the reference conductor 87 and the output terminals 552 and 553 with the anode 527.

In like manner a secondary winding 550 is serially connected between the reference conductor 87 and a pair of output terminals 555 and 556 with the Thyratron anode 530. It may thus be seen that by a proper selection of the polarities of the transformer windings 549 and 550 on the transformer 542, when the voltage level on the conductor 100 exceeds that of the reference conductor 87 the Thyratron 525 is fired thereby to produce a signal on the "speed up" output terminals 555 and 566. On the other hand, when the level of voltage on the conductor 100 is less than that on the reference conductor 87, the Thyratron 524 is fired thereby to provide an output signal on the "slow down" output terminals 552 and 553.

It will thus be seen that the present invention provides a method and apparatus for mixing and blending several ingredients in a predetermined proportion. Moreover, the ingredients are continuously fed at controlled proportional rates of flow so that the rate of flow of each ingredient is continuously in the same proportion to the rate of flow of each other ingredient as the total quantity of each ingredient in the total mixture is to the total quantity of each other ingredient in the total mixture. Pre-setting of the rates of flow of each ingredient is unnecessary and the rate of flow of the entire system can be changed at any time merely by changing the speed of the master or reference conveyor. Moreover, the system can be easily and quickly changed over from automatic to manual operation whenever desired.

As will be apparent to those skilled in the art, the system employs no separate mixing device but utilizes the screw conveyors 34 and 50 and the elevator 38 to effect the required degree of mixing. Inasmuch as the different ingredients are continuously supplied in the proper proportion to the conveyor 34 from the conveyors 16, 17, 18, and 19 and to the elevator 38 from the conveyor sections 34a and 34b, exceedingly accurate mixing is achieved and a homogeneous blend is supplied to the customer. In this regard, improved mixing in the elevator 38 is achieved by selecting the speed of the motor 46 so that the material "backlegs" in the elevator. The term "backleg" as used in this art means that a portion of the material carried by each of the buckets 40 is dropped back into the elevator rather than thrown down the chute 48.

The system shown in the drawings and described hereinabove illustrates one application of the present invention. However, this invention finds application wherever several varying quantities are to be maintained in a desired proportion which may in itself be fixed or variable. For example, the hand-set rheostats 90–93 may be repositioned during the blending operation to alter the proportion of the ingredients of the mix. In addition, the rheostats 90–93 may be automatically controlled in response to other sensed information such, for example, as the moisture content of the mix or of one or more of the individual ingredients.

The invention has been described in connection with an electric bridge circuit which is novel and particularly suited for use in a fertilizer mixing and blending system but the broader aspects of this invention could be embodied in a hydraulic or penumatic control system.

The novel electric bridge sensing and control circuit is an improvement over and replaces the well known Wheatstone bridge which has been in use for many years for the purpose of precisely determining unknown resistance values.

In a similar manner but as a different use of a bridge circuit, potentiometers have been employed to provide one or more fixed total resistances across a common and static voltage supply. By sensing a current flow from the wiper of one potentiometer to another, the positions of the wipers can be matched by establishing a "null" point at which no current flows between legs of the bridge. This type of operation is described above in connection with the initial filling of the hoppers 10–13.

The disadvantage of the present usage of such circuits is that all the wipers must be in the same relative position on each potentiometer. Therefore, only unity relationships can be measured.

However, by using two variable resistors, or rheostats, in place of each potentiometer with a common terminal between them, a variable resistance can be obtained on each side of the common terminal which may be changed at will without affecting or changing the resistance on the other side of the common terminal.

By so purposely rearranging the bridge circuit in this manner with a plurality of legs in the bridge, each leg containing two rheostats as above, there is made available in each leg, two wipers, instead of one, the positions which may be used for setting up proportional relationships in any proportion with an accuracy that is limited only by the precision of resistor and circuitry manufacture known to the art, and the sensitivity of amplifiers used to detect exact nulls between center points or common rheostat terminals of the various legs.

A voltage dropping resistor is provided in the supply line which provides an equal voltage across all legs of the bridge to cause the voltage across the bridge to vary with the total resistance of the bridge. This provides a more uniform sensing voltage between the legs of the bridge when some rheostats are near zero resistance and allows use of the bridge at infinitely small resistance values, adjusting the voltage to the value required for current limiting and preventing damage and heating of the rheostats. The prevention of heat generation in the rheostats maintains a close tolerance in the resistance values of the rheostats. Proportional relationship may be changed at will, without substitution of resistors, and the proportional relationship, once established, may be used for the control or determination of different or continuously changing quantities in all legs of the bridge.

In other words, dissimilar positions of the plurality of wipers can be used to indicate or control such proportions or quantities involved.

One of the unlimited number of applications for this method is described herein in which a particular combination of this apparatus is used to control separately proportional speeds of motors and proportional flow of materials. The weight of each material in a batch to be mixed is a mathematical function of the weight of each other material in the batch. Also several motors can be caused to operate at speeds in the same proportion regardless of the general level of speed selected.

As described above, the manual speed control potentiometers 271 in the several motor control units 65–68 are set to the same speed. However, in many situations the ingredients in the different hoppers 10–13 flow at different rates even though the feed motors 22–25 run at the same speed. Hence, during the initial conveyor filling phase of the operation the conveyors will not all be filled at the same time. Where a precise and homogeneous blend is required right from the start, the potentiometers 271 may be set to different selected values whereby the motors 22–25 run at the proper speeds during the conveyor filling phase of the operation to fill all of the conveyors 16–19 at the same time. In this way, an accurate blend is achieved from the very beginning. In the alternative, basic motor speeds of the feed motors 22–25 may be set at proper levels by varying the basic field resistance setting. Two adjustable wipers are thus provided on the field resistor 228, the left-hand one of which 228a sets basic motor speed and the right-hand one of which 228b is the high speed setting.

While the present invention has been described herein, it will be understood that those skilled in the art may make many changes and modifications without departing from the invention and, therefore, it is intended by the appended claims to cover all changes and modifications which come within the true spirit and scope of this invention.

I claim:

1. Apparatus for feeding predetermined quantities of a plurality of ingredients, comprising
   a plurality of containers respectively holding said predetermined quantities of each of said ingredients,
   a plurality of feed means for respectively feeding said ingredients from said containers,
   and means solely responsive to the relative weights of said ingredients in said containers for controlling said feed means to maintain the quantities of said ingredients in said containers in the original proportion.

2. Apparatus as set forth in claim 1 wherein said means for controlling are continuously responsive to the respective quantities of said ingredients in said containers.

3. Apparatus as set forth in claim 1 wherein said means for controlling said feed means comprise a plurality of weighing scales each responsive to the weight of the ingredient in the associated container.

4. Apparatus as set forth in claim 1 wherein said means for controlling said feed means comprises a plurality of means respectively responsive to the rates at which said ingredients are fed for producing signals representative of said rates.

5. Apparatus for feeding a plurality of materials in a predetermined proportion, comprising
   a plurality of independently controllable feed means, one of said feed means being provided for each of said materials,
   means for measuring the amount of material fed by each of said feed means and for providing first signals having values proportional thereto,
   means for providing a second plurality of signals having respective relative values in said predetermined proportion,
   means responsive to each of said first signals and the corresponding one of said second signals to provide a plurality of third signals respectively proportional to the associated first and second signals,
   and means responsive to the differences between one of said third signals and each of the others of said third signals for controlling said feed means to maintain said differences zero.

6. Apparatus for feeding a plurality of materials in a predetermined proportion comprising,
   a plurality of independently controllable feed means, one of said feed means being provided for each of said materials,
   a first plurality of variable impedances, one of said impedances being respectively provided for each of said materials,
   means for continuously measuring the amount of material fed by each of said feed means and for adjusting said impedances to values proportional to the amount of the associated material fed,
   a second plurality of impedances each serially connected with one of said first impedances across a source of voltage, said second impedances having relative values in said predetermined proportion,
   and means responsive to the voltage differences between the respective junctions of said first and second impedances to control said feed means to maintain said differences zero.

7. Apparatus as set forth in claim 6 wherein said measuring means comprises a scale for weighing said material.

8. Apparatus as set forth in claim 6 wherein said first and second impedances are variable resistors.

9. Apparatus as set forth in claim 6 wherein said first and second impedances are variable resistances and said second impedance is adapted to be manually adjusted to set up said predetermined proportion.

10. Batch blending and mixing apparatus comprising,
    a plurality of hoppers for holding materials to be blended,
    a plurality of conveyors respectively associated with each of said hoppers for feeding materials therefrom,
    a plurality of weighing scales supporting respective sets of said hoppers and said conveyors,
    and means responsive to the relative weights measured by said scales to control the speed of said conveyors to maintain said weights in a predetermined proportion.

11. Apparatus as set forth in claim 10 comprising,
    means operative upon initiation of a blending and mixing operation to render said weight responsive control means inoperative until said conveyors are full.

12. Apparatus as set forth in claim 11 comprising,
    means operative upon the filling of said conveyors for setting the speeds of said conveyors in said predetermined ratio prior to said weight responsive control means becoming operative.

13. Apparatus as set forth in claim 10 comprising,
    time delay means operative upon initiation of a blending and mixing operation to operate said conveyors at the same speed and to render said weight responsive control means inoperative for a period of time approximately equal to the time required to fill said conveyors.

14. Apparatus as set forth in claim 13 comprising,
    additional time delay means for initially setting the speeds of said conveyors in about said predetermined proportions and for rendering said weight responsive control means inoperative during the initial setting of said conveyor speeds.

15. Batch blending and mixing apparatus comprising,
    a plurality of hoppers for holding the materials to be blended,
    a plurality of continuous weighing conveyors for feeding materials from said hoppers, and
    control means responsive to the relative values of accumulated weights measured by said weighing conveyors to maintain said delivered weights in a predetermined portion.

16. Blending and mixing apparatus comprising,
    a plurality of controllable feed means for feeding materials,
    means for continuously sensing the quantities of materials which have been fed by said feed means and for producing signals representative of said quantities, and
    means responsive to the relative values of said signals for controlling said feed means to maintain said quantities in a predetermined proportion.

17. Apparatus for maintaining a plurality of variables in a predetermined relationship, comprising
    means for deriving a first signal having a value respectively related to one of said variables,
    means for deriving a plurality of second signals respectively related to each of said other variables,
    means for comparing said first signal with each of said second signals to provide a plurality of third signals, and means responsive to said third signals for controlling said other variables to maintain said variables in said predetermined relationship.

18. Apparatus according to claim 17 wherein said means for deriving each of said first and second signals each comprises
    first and second potentiometers each having an independently adjustable wiper,
    means electrically connecting the wipers on said potentiometers together,
    means connecting one terminal portion of each of said potentiometers to a source of voltage whereby a voltage is established across said potentiometers, and
    means for automatically adjusting the position of the wiper on said first potentiometer in relation to the value of the associated variable.

19. Apparatus according to claim 17 wherein said means for deriving said first and second signals each comprises
    means for providing a plurality of preset signals related to one another in accordance with said preset relationship, and
    means responsive to the relationship between the value of the associated variable and the value of a respective one of said preset signals for providing said first and second signals.

20. Apparatus according to claim 19 wherein said variables are the quantities of ingredients fed to a process station, and
    said means for controlling said variables comprises a plurality of continuously driven feed means for said ingredients.

21. Apparatus according to claim 17 wherein said means for deriving said first and second signals comprises
    means for setting up a plurality of values in a predetermined relative proportion, and
    means for comparing each of said plurality of values with respective ones of said variables to derive said first and second signals.

22. Apparatus according to claim 21 wherein said means for setting up said plurality of values comprises a plurality of variable impedances.

23. Apparatus according to claim 21 wherein said means for comparing comprises a plurality of variable impedances.

References Cited by the Examiner

UNITED STATES PATENTS

| | | | |
|---|---|---|---|
| 2,395,657 | 2/1946 | Dinsmore et al. | 103—97 |
| 2,658,644 | 11/1953 | Lowe | 222—58 |
| 2,757,329 | 7/1956 | Lichtenfels | 318—338 X |
| 2,969,227 | 1/1961 | Ludwig | 222—56 |
| 3,058,621 | 10/1962 | Stenzel | 222—58 |

FOREIGN PATENTS

| | | |
|---|---|---|
| 1,160,190 | 7/1958 | France. |

LOUIS J. DEMBO, *Primary Examiner.*

HADD S. LANE, *Examiner.*